(12) United States Patent
Axelrod et al.

(10) Patent No.: US 11,350,605 B2
(45) Date of Patent: Jun. 7, 2022

(54) ADJUSTABLE BRUSH

(71) Applicant: FOUR PAWS PRODUCTS, LTD, Neptune City, NJ (US)

(72) Inventors: Glen S. Axelrod, Colts Neck, NJ (US); Ajay Gajria, Maharashtra (IN); Mary Louise Fetter, Ocean, NJ (US)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 892 days.

(21) Appl. No.: 16/050,165

(22) Filed: Jul. 31, 2018

(65) Prior Publication Data
US 2020/0037580 A1 Feb. 6, 2020

(51) Int. Cl.
*A46B 5/00* (2006.01)
*A45D 24/04* (2006.01)
*A01K 13/00* (2006.01)
*A46B 7/10* (2006.01)

(52) U.S. Cl.
CPC .......... *A01K 13/002* (2013.01); *A46B 5/0004* (2013.01); *A46B 7/10* (2013.01); *A45D 24/04* (2013.01); *A46B 2200/1093* (2013.01)

(58) Field of Classification Search
CPC .............. A45D 24/04; A45D 2024/002; A45D 24/007; A45D 24/02; A45D 24/30; A46B 7/10; A46B 5/0004; A01K 13/002
USPC ........ 119/625, 626; 132/219, 120, 151, 161, 132/152; 15/22.1, 23, 27, 207.2
See application file for complete search history.

(56) References Cited

U.S. PATENT DOCUMENTS

| | | | | |
|---|---|---|---|---|
| 792,887 | A | | 6/1905 | Erstling |
| 3,893,424 | A | | 7/1975 | Casler |
| 4,187,866 | A | * | 2/1980 | Zwiren ................. A45D 24/04 132/151 |
| 4,984,590 | A | * | 1/1991 | Bachtell ................ A45D 24/02 132/150 |
| 5,353,817 | A | * | 10/1994 | Kantor ................. A01K 13/002 119/625 |
| 6,510,856 | B1 | * | 1/2003 | Ahn ..................... A41G 5/0086 132/126 |
| 6,955,137 | B2 | | 10/2005 | Dunn et al. |

(Continued)

FOREIGN PATENT DOCUMENTS

| | | | | |
|---|---|---|---|---|
| CA | 2503925 | | 10/2006 | |
| GB | 142511 | A * | 3/1921 | ............... A46B 7/10 |

(Continued)

OTHER PUBLICATIONS

Website printout from: "https://www.amazon.com/SAWMONG-Shedding-Grooming-Dematting-Haired/dp/B072P29R94/ref=sr_1_1/141-2744848-8561263?ie=UTF8&qid=1534349381&sr=8-1&keywords=sawmong+pet+shedding+tool&dpID=41-bDCLIhKL&preST=_SY300_QL70_&dpSrc=srch", dated Feb. 24, 2018.

(Continued)

*Primary Examiner* — Yvonne R Abbott-Lewis
(74) *Attorney, Agent, or Firm* — Grossman, Tucker, Perreault & Pfleger, PLLC

(57) ABSTRACT

An example adjustable brush may include a brush head and a handle extending from the brush head. The brush head may include a first plurality of teeth extending along a rotation axis and a second plurality of teeth extending along the rotation axis. The second plurality of teeth may be rotatable independently of the first plurality of teeth about the rotation axis.

20 Claims, 11 Drawing Sheets

(56) References Cited

U.S. PATENT DOCUMENTS

| | | | | |
|---|---|---|---|---|
| 7,814,602 | B2* | 10/2010 | Stydahar | A46B 7/10 |
| | | | | 15/22.3 |
| 10,602,717 | B2* | 3/2020 | Cathaud | A45D 24/30 |
| 2004/0250831 | A1 | 12/2004 | Rizzuto | |
| 2009/0272393 | A1* | 11/2009 | Stydahar | A46B 7/06 |
| | | | | 132/200 |
| 2012/0304938 | A1 | 12/2012 | Wang | |
| 2014/0026821 | A1 | 1/2014 | Tu | |
| 2014/0026822 | A1 | 1/2014 | Harris, II | |
| 2014/0238310 | A1 | 8/2014 | Holt, Jr. | |
| 2014/0261227 | A1* | 9/2014 | Sullivan | A01K 13/002 |
| | | | | 119/625 |

FOREIGN PATENT DOCUMENTS

| | | |
|---|---|---|
| GB | 2532519 | 5/2016 |
| GN | 2930404 | 8/2007 |
| GN | 103099420 | 5/2013 |

OTHER PUBLICATIONS

International Search Report and Written Opinion from related PCT Appln. No. PCT/US2019/033041, dated Aug. 5, 2019.
International Search Report from corresponding PCT Appln. No. PCT/US18/24440, dated Jun. 18, 2018.
Office Action from related Japanese Application No. 2019-547976, dated Dec. 15, 2021.
Extended Search Report in related European Application No. 18776439. 4, dated Oct. 12, 2021.
"Grooming Brush", Available on May 15, 2015, Retrieved May 17, 2018, from http://www.dx.com/p/deie-q-003-nh-dog-cat-pets-grooming-comb-hair-fur-knot-brush-pink-black-3191>; Figure 1, p. 2.
Extended Search Report in related European Application No. 19843965. 5, dated Mar. 1, 2022.

* cited by examiner

ADJUSTABLE BRUSH

TECHNICAL FIELD

The present disclosure is generally related to brushes and more particularly to brushes having adjustable tooth spacing.

BACKGROUND INFORMATION

Grooming brushes may be used with domesticated animals (e.g., dogs, cats, horses, or the like). A grooming brush may be used to remove and/or prevent the animal's fur/hair from developing tangles or knots. In addition, a grooming brush may reduce the amount of fur/hair that the animal sheds and/or hasten the rate at which the fur/hair is removed from the body of the animal. For example, the grooming brush may remove fur/hair from the animal prior to the fur/hair naturally falling from the animal and collecting on a surface (e.g., a floor of a house or furniture). Therefore, a grooming brush may yield benefits to both the owner of the animal and the animal itself.

Grooming brushes may include a handle and one or more protrusions (e.g., bristles) that extend from a portion of the grooming brush. The effectiveness of the grooming brush may be a result of the material forming the protrusions, the spacing between each of the protrusions, and/or one or more characteristics of the fur/hair being groomed (e.g., length of the fur/hair, thickness of the coat formed by the fur/hair, and/or the wiriness of the fur/hair). As a result, a grooming brush that is effective in grooming a first animal may not be effective in grooming a second animal. Furthermore, while a grooming brush may be effective in grooming a specific animal, the effectiveness may not be maximized because the grooming brush is not able to be adjusted to suit the unique characteristics of the specific animal's fur/hair. For example, if the spacing between the protrusions is too wide or too narrow, the grooming brush may not function properly and may result in discomfort to the animal being groomed.

SUMMARY

An example adjustable brush may include a brush head and a handle extending from the brush head. The brush head may include a first plurality of teeth extending along a rotation axis and a second plurality of teeth extending along the rotation axis. The second plurality of teeth may be rotatable independently of the first plurality of teeth about the rotation axis.

Another example adjustable brush may include a brush head, a handle extending from the brush head, a first plurality of teeth, a second plurality of teeth, and a knob. At least a portion of the first plurality and second plurality of teeth may extend from the brush head and a rotation of the knob may cause a corresponding rotation of at least the second plurality of teeth about a rotation axis. The second plurality of teeth may be rotatable independently of the first plurality of teeth.

BRIEF DESCRIPTION OF THE DRAWINGS

These and other features and advantages will be better understood by reading the following detailed description, taken together with the drawings, wherein.

DETAILED DESCRIPTION OF PREFERRED EMBODIMENTS

A brush having an adjustable tooth spacing is generally disclosed herein. The brush may include a brush head, a handle extending from the brush head, and a first plurality and a second plurality of teeth. The second plurality of teeth may be transitionable from an extended position to a retracted position independently of the first plurality of teeth. The second plurality of teeth may be interspersed (e.g., distributed) between the first plurality of teeth. As a result, when the second plurality of teeth is transitioned into the retracted position, a separation distance between adjacent teeth in the extended position is increased.

Figure 1:
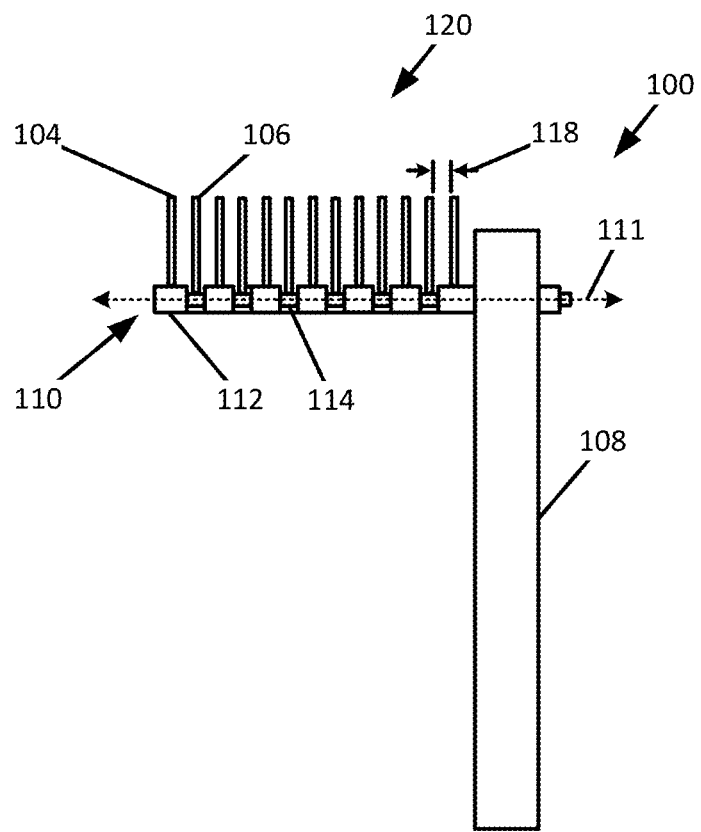
FIG. 1 shows a schematic plan view of a brush having adjustable teeth spacing, consistent with embodiments of the present disclosure.

As shown in FIG. 1, a brush 100 includes a first plurality of teeth 104, a second plurality of teeth 106, and a handle 108. A carriage 110 is coupled (e.g., rotatably coupled) to the handle 108 and extends along a rotation axis 111. The first and second pluralities of teeth 104 and 106 extend from the carriage 110. The first and/or second plurality of teeth 104 and 106 may be rotatable about the rotation axis 111 that extends through the carriage 110. The carriage 110 includes a rotatable carrier 112 and a rotatable shaft 114. The rotatable shaft 114 extends through the rotatable carrier 112 along the rotation axis 111. The first plurality of teeth 104 rotate at least in response to a rotation of the rotatable carrier 112 and the second plurality of teeth 106 rotate at least in response to a rotation of the rotatable shaft 114.

As shown, the second plurality of teeth 106 can be interspersed (e.g., distributed) between the first plurality of teeth 104. For example, as shown, the second plurality of teeth 106 can be evenly distributed between the teeth of the first plurality of teeth 104.

The rotatable carrier 112 can be configured such that a rotation of the rotatable shaft 114 does not necessarily result in a corresponding rotation of the rotatable carrier 112.

Therefore, the first and second pluralities of teeth 104 and 106 may rotate independently of each other. As a result, a tooth spacing 118, as measured at a distal most end 120 of the brush 100, can be varied. Therefore, the brush 100 may generally be described as having a plurality of teeth with variable tooth spacing.

Figure 2:
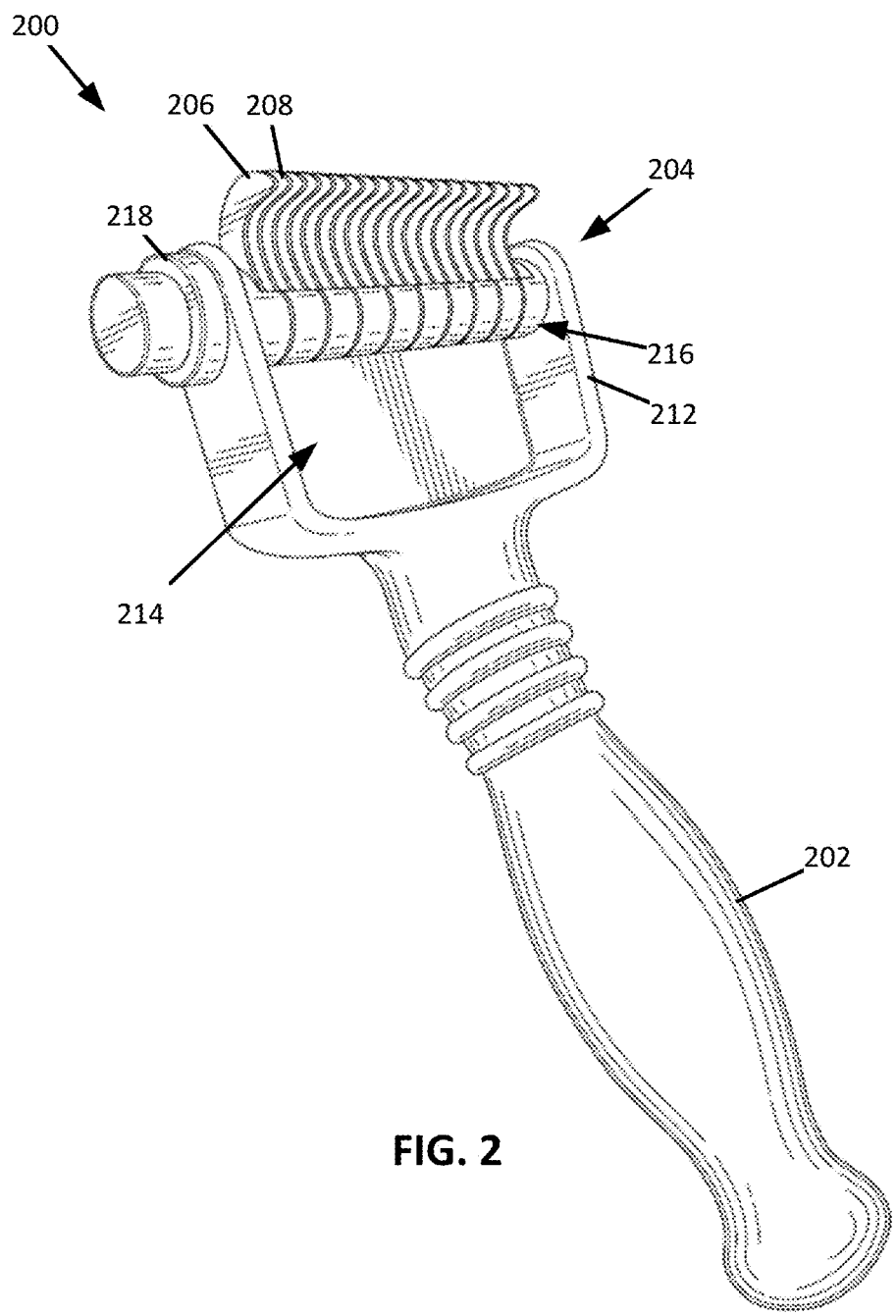
FIG. 2 shows a perspective view of a brush having adjustable teeth spacing, consistent with embodiments of the present disclosure.

FIG. 2 shows a perspective view of a brush 200, which may be an example of the brush 100 of FIG. 1. As shown, the brush 200 includes a handle 202 and a brush head 204 extending from the handle 202. The brush head 204 includes a first plurality of rotatable teeth 206 and a second plurality of rotatable teeth 208. The brush head 204 also includes a plurality of arms 212 extending from handle 202. As shown, the arms 212 define a receptacle 214 for receiving at least a portion of a carriage 216 from which the first and second pluralities of teeth 206 and 208 extend. In other words, at least a portion of the carriage 216 can be disposed between the arms 212.

The carriage 216 is rotatably coupled to the brush head 204 (e.g., to the arms 212). A rotation of at least a portion of the carriage 216 can cause a corresponding rotation in at least one of the first and/or second plurality of teeth 206 and 208. The rotation of at least a portion of the carriage 216 can correspond to a rotation of a first knob 218. As a result, a rotation of the first knob 218 can cause a corresponding rotation of at least one of the first and/or second plurality of teeth 206 and 208.

Figure 3:
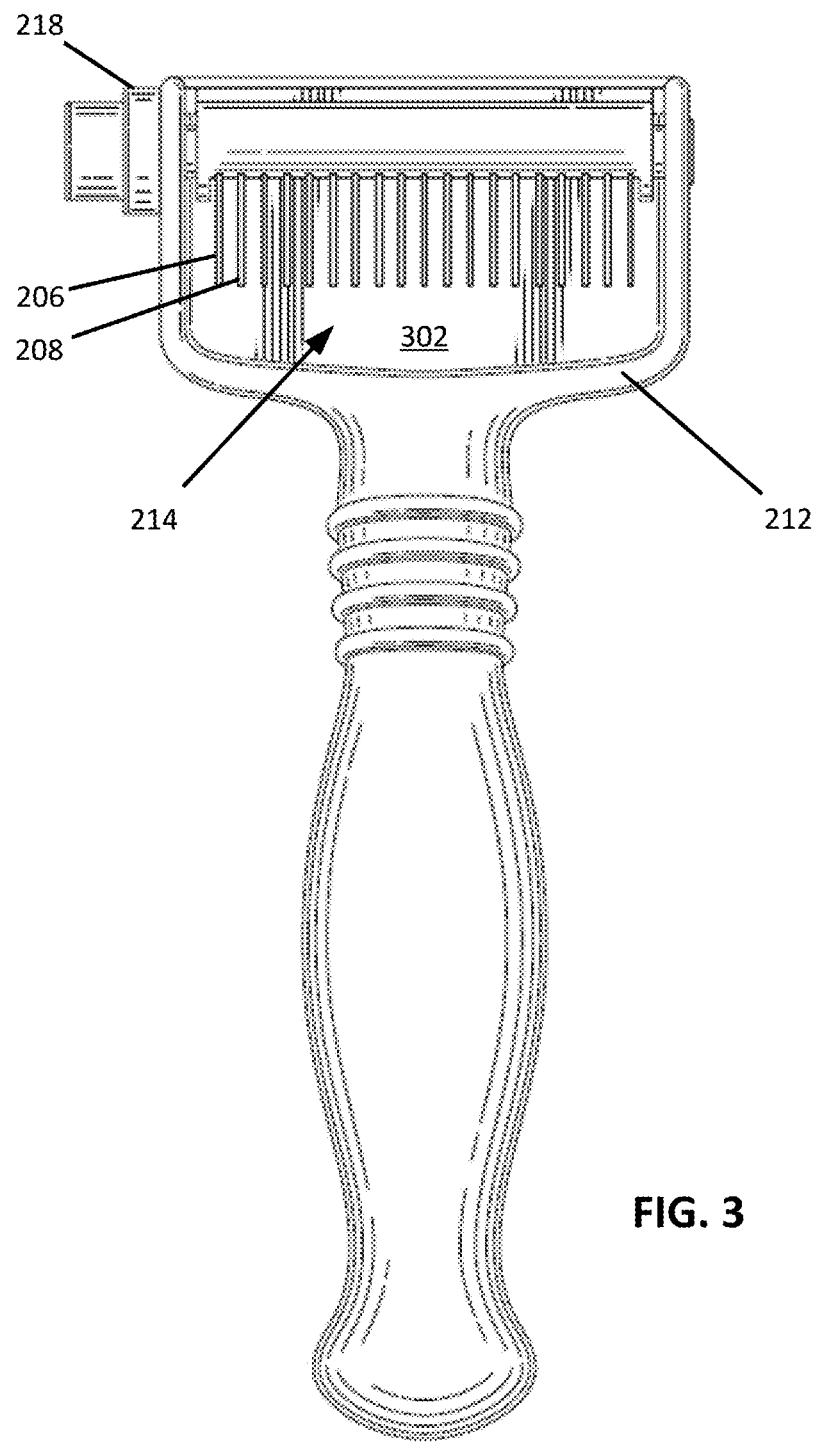
FIG. 3 shows a plan view of the brush of FIG. 2 having the teeth in a retracted position, consistent with embodiments of the present disclosure.

FIG. 3 shows the first and second pluralities of teeth 206 and 208 in a retracted position. A rotation of the first knob 218 in a first rotation-direction (e.g., clockwise) may cause the first and/or second plurality of teeth 206 and 208 to transition into the retracted position from an extended position (e.g., as shown in FIG. 2). When in the retracted position, at least a portion of the first and/or second plurality of teeth 206 and 208 are disposed within the receptacle 214 defined by the arms 212.

As shown, the receptacle 214 is further defined by a sidewall 302 extending between the arms 212. When the first and/or second plurality of teeth 206 and 208 are in the retracted position, the sidewall 302 can engage at least of portion of the first and/or second plurality of teeth 206 and 208. Such engagement may prevent the rotation of the first and/or second plurality of teeth 206 and 208 beyond a predetermined position. In some instances, a retaining mechanism may be provided for retaining the first and/or second plurality of teeth 206 and 208 in the retracted position. For example, a detent may be provided in one or more of the arms 212 that engages at least a portion of the carriage 216.

Figure 4:
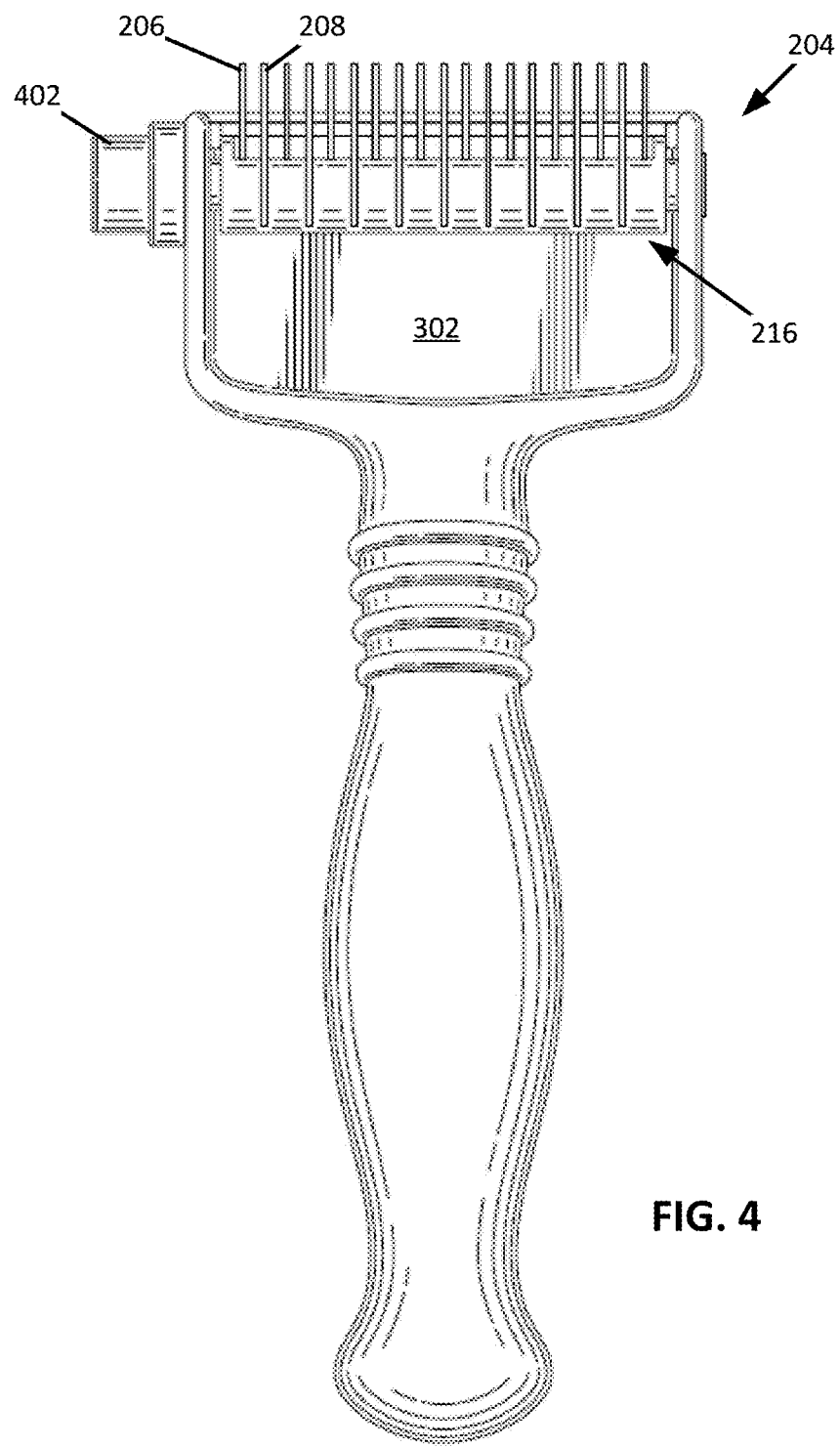
FIG. 4 shows a plan view of the brush of FIG. 2 having the teeth in an extended position, consistent with embodiments of the present disclosure.

FIG. 4 shows the first and second pluralities of teeth 206 and 208 in the extended position. A rotation of a second knob 402 in a second rotation-direction, opposite the first rotation-direction, (e.g., counter-clockwise) may cause the first and/or second plurality of teeth 206 and 208 to transition from the retracted position to the extended position. When in the extended position, at least a portion of the first and/or second plurality of teeth 206 and 208 extend from the brush head 204 such that the first and/or second plurality of teeth 206 and 208 are capable of engaging, for example, the fur/hair of an animal. The sidewall 302 can engage at least a portion of the carriage 216 when the first and/or second plurality of teeth 206 and 208 are in the extended position. Such engagement may prevent the rotation of the first and/or second plurality of teeth 206 and 208 beyond a predetermined position. In some instances, a retaining mechanism may be provided for retaining the first and/or second plurality of teeth 206 and 208 in the extended position. For example, a detent may be provided in one or more of the arms 212 that engages at least a portion of the carriage 216.

As shown, when the first and second pluralities of teeth 206 and 208 are in the extended position, the second plurality of teeth 208 may be distributed between the first plurality of teeth 206. For example, when the first and second pluralities of teeth 206 and 208 are in the extended position, each tooth of the first plurality of teeth 206 can be separated from another tooth of the first plurality of teeth 206 by at least one tooth of the second plurality of teeth 208.

Figure 5:
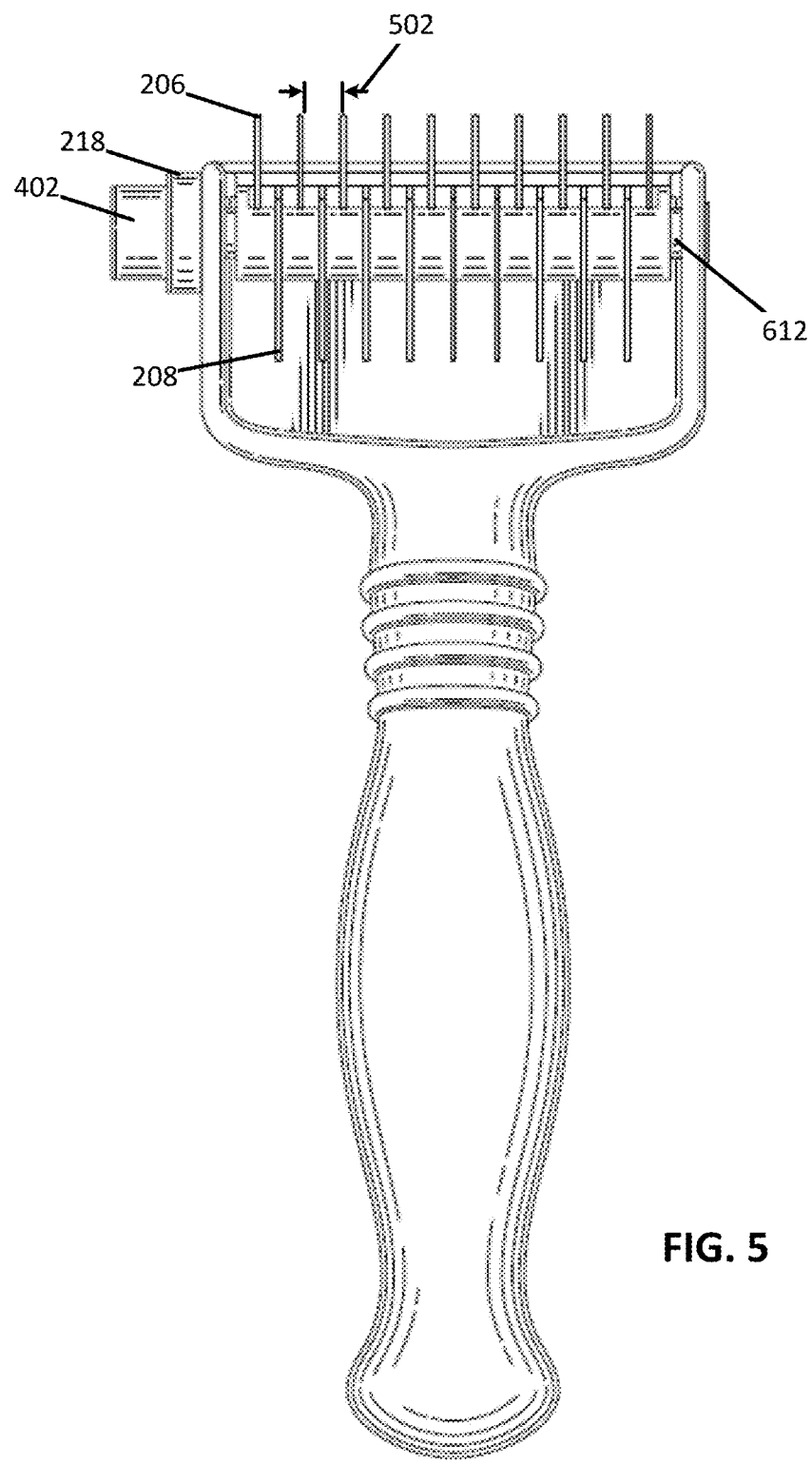
FIG. 5 shows a plan view of the brush of FIG. 2 having a first plurality of teeth in an extended position and a second plurality of teeth in a retracted position, consistent with embodiments of the present disclosure.

FIG. 5 shows the first plurality of teeth 206 in the extended position and the second plurality of teeth 208 in the retracted position. As a result, a separation distance 502 between adjacent teeth is increased, when compared to an arrangement having both the first and second pluralities of teeth 206 and 208 in the extended position. In other words, the separation distance 502 between adjacent teeth may generally be described as being adjustable.

For example, when both the first and second pluralities of teeth 206 and 208 are in the extended position, the separation distance 502 between adjacent teeth may measure in a range of 1 millimeter (mm) to 7 mm. By way of further example, when both the first and second pluralities of teeth 206 and 208 are in the extended position, the separation distance 502 between adjacent teeth may measure in a range of 2 mm to 5 mm. By way of even further example, when the first plurality of teeth 206 is in the extended position and the second plurality of teeth 208 is in the retracted position, the separation distance 502 between adjacent teeth may measure in a range of 3 mm to 10 mm. By way of still further example, when the first plurality of teeth 206 is in the extended position and the second plurality of teeth 208 is in the retracted position, the separation distance 502 between adjacent teeth may measure in a range of 4 mm to 8 mm.

When the first and second pluralities of teeth 206 and 208 are initially in the extended position, a rotation of the second knob 402 in the first rotation-direction (e.g., clockwise) may cause only the second plurality of teeth 208 to transition into the retracted position. As a result, the first plurality of teeth 206 remain in the extended position. When the first and second pluralities of teeth 206 and 208 are initially in the retracted position, a rotation of the first knob 218 in the second rotation-direction (e.g., counter clockwise) may cause only the first plurality of teeth 206 to transition into the extended position. As a result, the second plurality of teeth 208 remain in the retracted position.

Figure 6:
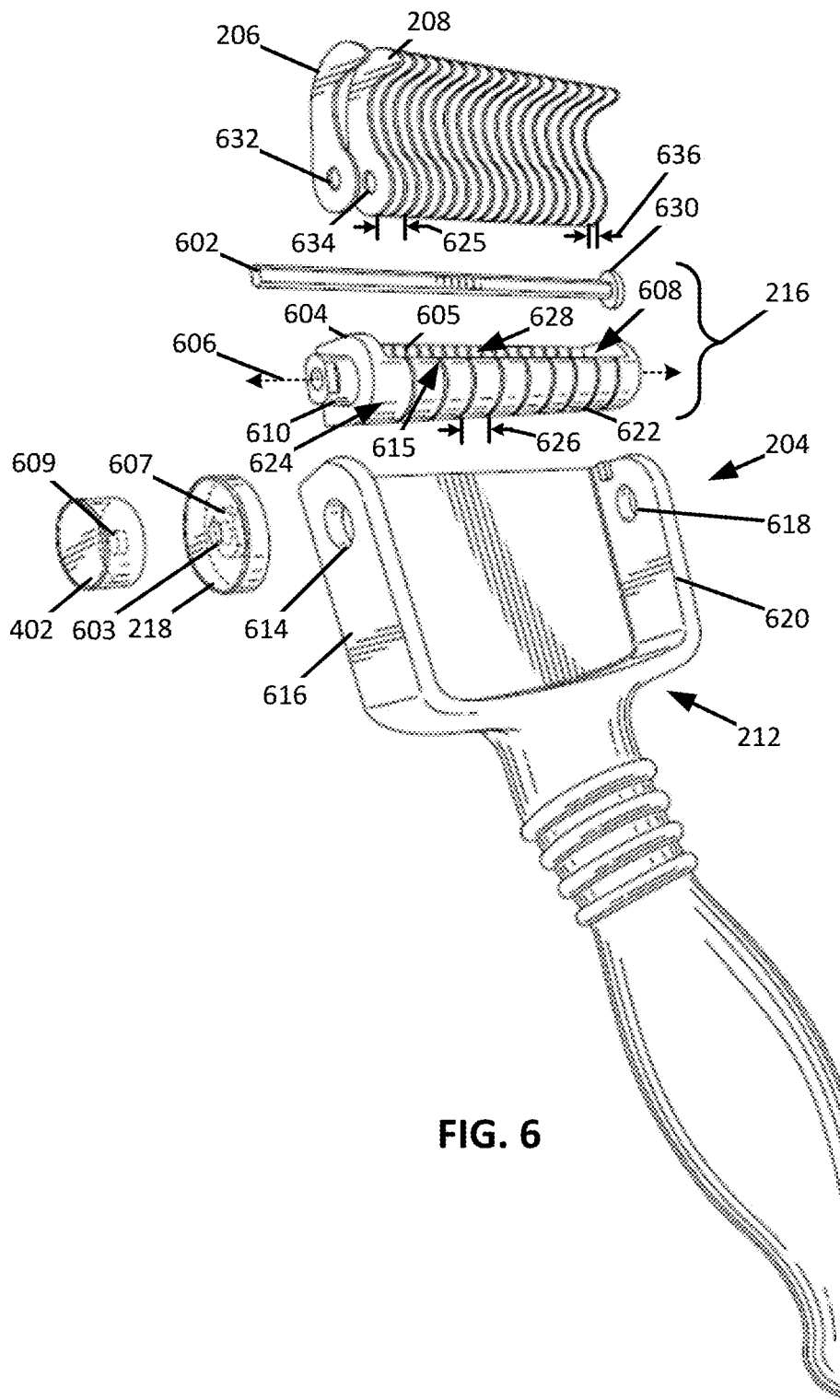
FIG. 6 shows an exploded view of the brush of FIG. 2, consistent with embodiments of the present disclosure.

As shown in FIG. 6, the carriage 216 includes a rotatable shaft 602 and a rotatable carrier 604. The rotatable shaft 602 extends through the rotatable carrier 604 along a rotation axis 606 of the first and second pluralities of teeth 206 and 208. The rotatable shaft 602 is rotatable relative to the rotatable carrier 604 and the rotatable carrier 604 is rotatable relative to the brush head 204. The rotatable shaft 602 is capable of being rotated independently of the rotatable carrier 604 and the rotatable carrier 604 is capable of being rotated independently of the rotatable shaft 602.

As shown, the rotatable carrier 604 defines a channel 608 that extends along the rotation axis 606. The first and second pluralities of teeth 206 and 208 extend within the channel 608 and along the rotation axis 606. In other words, the channel 608 is configured to receive the first and second pluralities of teeth 206 and 208.

As shown, the rotatable carrier 604 includes a first protrusion 610 and a second protrusion 612 (see, e.g., FIG. 5). The first protrusion 610 is received in a first aperture 614 that extends through a first arm 616 of the plurality arms 212. The second protrusion 612 extends at least partially through a second aperture 618 that extends at least partially through a second arm 620 of the plurality of arms 212. The first and second protrusions 610 and 612 are capable of rotation within the first and second apertures 614 and 618 such that the rotatable carrier 604 rotates relative to the brush head 204.

The first protrusion 610 is coupled to the first knob 218 such that rotation of the first knob 218 causes a corresponding rotation in the rotatable carrier 604. As shown, the first knob 218 includes an opening 603 extending through the first knob 218. The rotatable shaft 602 extends through the opening 603. The second knob 402 is coupled to the rotatable shaft 602 such that rotation of the second knob 402 causes a corresponding rotation in the rotatable shaft 602. When the second knob 402 is coupled to the rotatable shaft 602, the first knob 218 is prevented from unintentionally disengaging the first protrusion 610. As such, the second knob 402 may slideably engage a surface of the first knob 218.

As shown, the rotatable shaft 602 extends through the first protrusion 610 such that the rotatable shaft 602 is capable of rotation relative to the rotatable carrier 604. In some instances, and as shown, the rotatable shaft 602 can extend through the second arm 620 into the rotatable carrier 604 and out of the first protrusion 610. In these instances, the rotatable shaft 602 may include a cap 630. The cap 630 is disposed at a distal end of the rotatable shaft 602 that is opposite the second knob 402. The cap 630 may prevent the rotatable shaft 602 from unintentionally disengaging the rotatable carrier 604.

At least a portion of the first protrusion 610, the second protrusion 612, and/or the rotatable shaft 602 may have non-circular cross-sections (e.g., as taken perpendicular to the rotation axis 606). For example, the non-circular cross-section of the first protrusion 610 and/or the rotatable shaft 602 may generally resemble a square, a triangle, a pentagon, a hexagon, an ellipse, a piriform, a half-circle, and/or any other suitable shape. However, in some instances, at least a portion of the first protrusion 610, the second protrusion 612, and/or the rotatable shaft 602 may have a circular cross-section. The first and second apertures 614 and 618 may have any suitable shape that allows for the rotation of the first and second protrusions 610 and 612 relative to the first and second apertures 614 and 618. For example, in some instances, the first and second apertures 614 and 618 may be circular. The first and/or second knobs 218 and 402 may be coupled to the first protrusion 610 and/or the rotatable shaft 602 using any one or more of an adhesive, a press-fit, a mechanical fastener (e.g., a screw or a bolt), and/or any other suitable form of coupling.

In some instances, the first knob 218 may include a first knob receptacle 607 (shown in hidden lines) configured to receive at least a portion of the first protrusion 610. Therefore, the first knob receptacle 607 may generally correspond to a shape of at least a portion of the first protrusion 610. The second knob 402 may include a second knob receptacle 609 (shown in hidden lines) configured to receive at least a portion of the rotatable shaft 602. Therefore, the second knob receptacle 609 may generally correspond to a shape of at least a portion of the rotatable shaft 602.

As shown, the rotatable carrier 604 includes a plurality of apertures (or slits) 622 that extend from an exterior surface 624 of the rotatable carrier 604 and into the channel 608. The apertures 622 are disposed longitudinally along the rotatable carrier 604 and have an open end 615 configured to receive the second plurality of teeth 208. Therefore, the apertures 622 are aligned with the second plurality of teeth 208. In other words, a separation distance 626 between the apertures 622 corresponds to a separation distance 625 between adjacent teeth of the second plurality of teeth 208. As such, when both the first and second pluralities of teeth 206 and 208 are in the extended position, a rotation of the second knob 402 in the first rotation-direction (e.g., clockwise) causes the second plurality of teeth 208 to rotate into the apertures 622. Rotation of the second plurality of teeth 208 into the apertures 622, allows the second plurality of teeth 208 to transition into a retracted position while allowing the first plurality of teeth 206 to remain in the extended position. In other words, rotation of the second plurality of teeth 208 does not cause the rotatable carrier 604 to rotate.

As also shown, the channel 608 defines an engagement surface 628 configured to engage the first and second pluralities of teeth 206 and 208. For example, when the first and second pluralities of teeth 206 and 208 are in the extended position, a rotation of the first knob 218 in the first rotation-direction (e.g., clockwise), causes the engagement surface 628 to urge both the first and second pluralities of teeth 206 and 208 into the retracted position. Similarly, when both the first and second pluralities of teeth 206 and 208 are in the retracted position, a rotation of the second knob 402 in the second rotation-direction (e.g., counter clockwise) results in the engagement surface 628 urging the first plurality of teeth 206 into the extended position as a result of the rotation of the second plurality of teeth 208.

By way of further example, when the first and second pluralities of teeth 206 and 208 are in the retracted position, a rotation of the first knob 218 in the second rotation-direction (e.g., counter clockwise) results in the engagement surface 628 urging the first plurality of teeth 206 into the extended position while the second plurality of teeth 208 pass through the open end 615 of the apertures 622 and remain in the retracted position.

As shown, the rotatable carrier 604 includes a plurality of grooves 605 that each correspond to and are configured to receive a respective tooth of the first and second pluralities of teeth 206 and 208. Therefore, the grooves 605 may generally be described as defining at least a portion of the engagement surface 628. As shown, the grooves 605 corresponding to the second plurality of teeth 208 are opposite the apertures 622 for receiving the second plurality of teeth 208. The grooves 605 that correspond to the first plurality of teeth 206 are disposed on opposing sides of the rotatable carrier 604 such that opposing sides of the teeth of the first plurality of teeth 206 are received within the grooves 605.

As shown, each tooth in the first plurality of teeth 206 includes a first tooth opening 632 that extends through a distal end of each respective tooth of the first plurality of teeth 206. The second plurality of teeth 208 includes a second tooth opening 634 that extends through a distal end of each respective tooth of the second plurality of teeth 208. The first and second tooth openings 632 and 634 are configured to receive the rotatable shaft 602 such that the rotatable shaft 602 extends through the first and second pluralities of teeth 206 and 208. The rotatable shaft 602 rotates relative to the first tooth opening 632 and is substantially prevented from rotation relative to the second tooth opening 634. For example, a size of the first tooth opening 632 may measure equal to or greater than a largest dimension of the rotatable shaft 602 and a size of the second tooth opening 634 may measure less than a largest dimension of the rotatable shaft 602 such that a press-fit is formed there-between. Additionally, or alternatively, in some instances, an adhesive, a mechanical fastener (e.g., a screw or a bolt), and/or any other suitable form of coupling may be used to couple the second plurality of teeth 208 to the rotatable shaft 602. In these instances, the first tooth opening 632 may measure substantially the same as the second tooth opening 634.

The first and/or second tooth openings 632 and 634 may have a circle shape, a square shape, a triangle shape, a pentagon shape, a hexagon shape, an elliptical shape, a piriform shape, a half-circle, and/or any other suitable shape. In some instances, the first and second tooth openings 632 and 634 may have a shape that generally corresponds to that of the rotatable shaft 602.

As shown, the first and second pluralities of teeth 206 and 208 have a hook-shape. However, the first and second pluralities of teeth 206 and 208 may have any shape. For example, L-shaped, S-shaped, and/or any other suitable shape. In some instances, for example, a shape of the first plurality of teeth 206 may be different from a shape of the second plurality of teeth 208.

Each of the teeth of the first and second pluralities of teeth 206 and 208 may have a tooth width 636. The tooth width 636 may measure, for example, in a range of 0.25 mm to 2 mm. By way of further example, the tooth width 636 may measure in a range of 0.75 mm to 1.25 mm. In some instances, the tooth width 636 may not be the same between the first and second pluralities of teeth 206 and 208. The tooth width 636 of the second plurality of teeth 208 may generally correspond to a width of the apertures 622 such that the second plurality of teeth 208 can be received within the open end 615 of the apertures 622 in response to a rotation of the second plurality of teeth 208 about the rotation axis 606.

The brush 200 may be made of multiple materials. For example, the first and second pluralities of teeth 206 and 208 may be made of any material. For example, the first and second pluralities of teeth 206 and 208 may be made of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material. In some instances, the first and second pluralities of teeth 206 and 208 may be formed of different materials.

By way of further example, the rotatable shaft 602 and the rotatable carrier 604 may be formed of any suitable material. For example, the rotatable shaft 602 and/or the rotatable carrier 604 may be made of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material. In some instances, the rotatable shaft 602 and the rotatable carrier 604 may be formed of different materials.

In some instances, at least a portion of the first plurality of teeth 206, the second plurality of teeth 208, the rotatable shaft 602, and/or the rotatable carrier 604 may be formed of a material having low frictional properties such as nylon or polytetrafluoroethylene.

Figure 7:
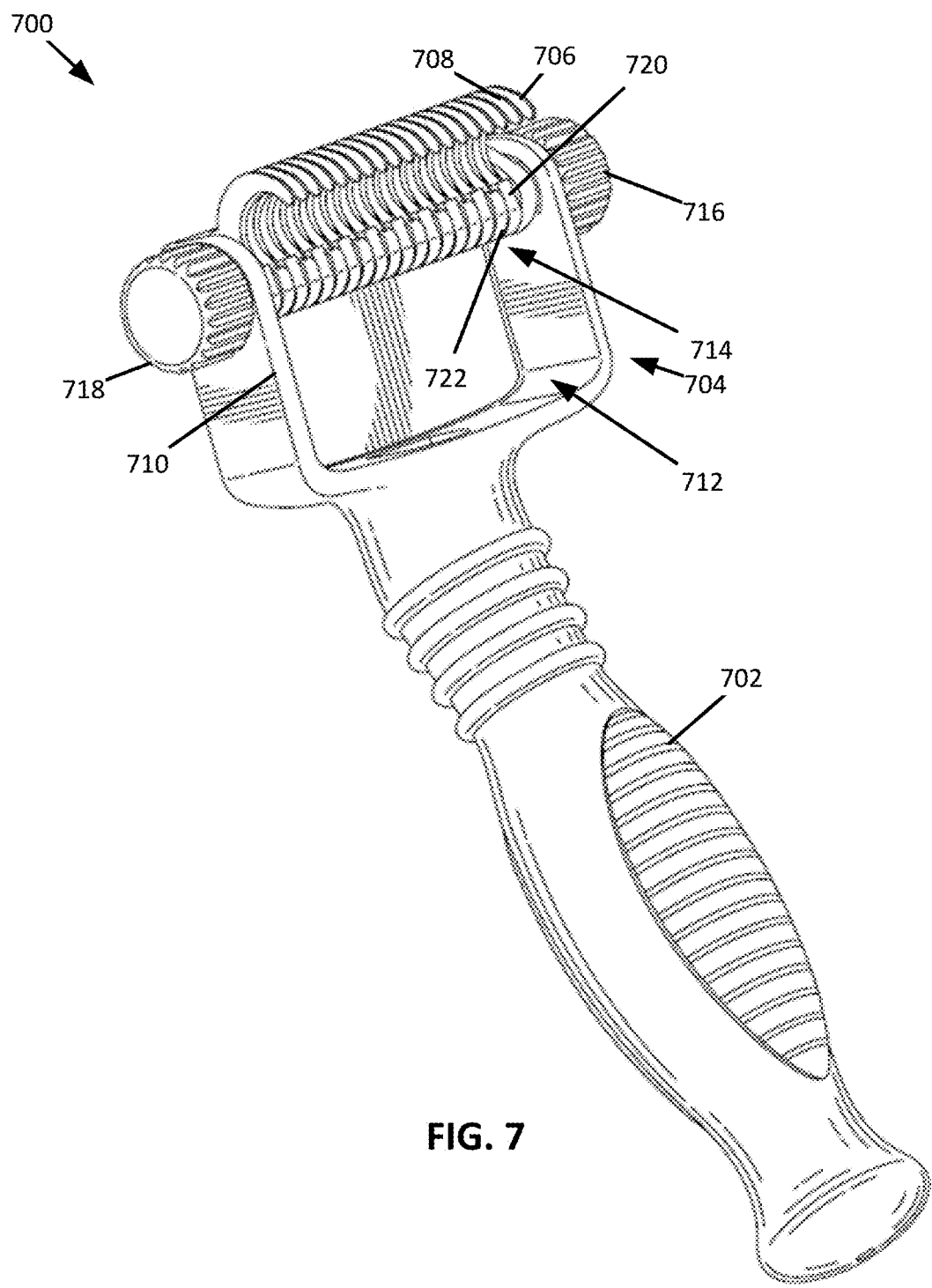
FIG. 7 shows a perspective view of a brush having adjustable teeth spacing, consistent with embodiments of the present disclosure.

FIG. 7 shows a perspective view of a brush 700, which may be an example of the brush 100 of FIG. 1. As shown, the brush 700 includes a handle 702 and a brush head 704 extending from the handle 702. The brush head 704 includes a first plurality of rotatable teeth 706 and a second plurality of rotatable teeth 708. The brush head 704 includes a plurality of arms 710 which define a receptacle 712 for receiving at least a portion of the first and second pluralities of teeth 706 and 708. As shown, the first and second pluralities of teeth 706 and 708 extend from a carriage 714 disposed at least partially within the receptacle and at least partially between the plurality of arms 710.

At least a portion of the carriage 714 is rotatably coupled to the brush head 704 (e.g., the arms 710). At least a portion of the carriage 714 is rotatable in response to a rotation of a first knob 716 and/or a second knob 718. As shown, the first and second knobs 716 and 718 are disposed on opposing sides of the brush head 704. A rotation of the first knob 716 may result in a corresponding rotation of a first portion 720 of the carriage 714 and a rotation of the second knob 718 may result in a corresponding rotation of a second portion 722 of the carriage 714. The first portion 720 of the carriage 714 may be coupled to the first plurality of teeth 706 such that a rotation of the first knob 716 causes a corresponding rotation of at least the first plurality of teeth 706. The second portion 722 of the carriage 714 may be coupled to the second plurality of teeth 708 such that a rotation of the second knob 718 causes a corresponding rotation of at least the second plurality of teeth 708.

Figure 8:
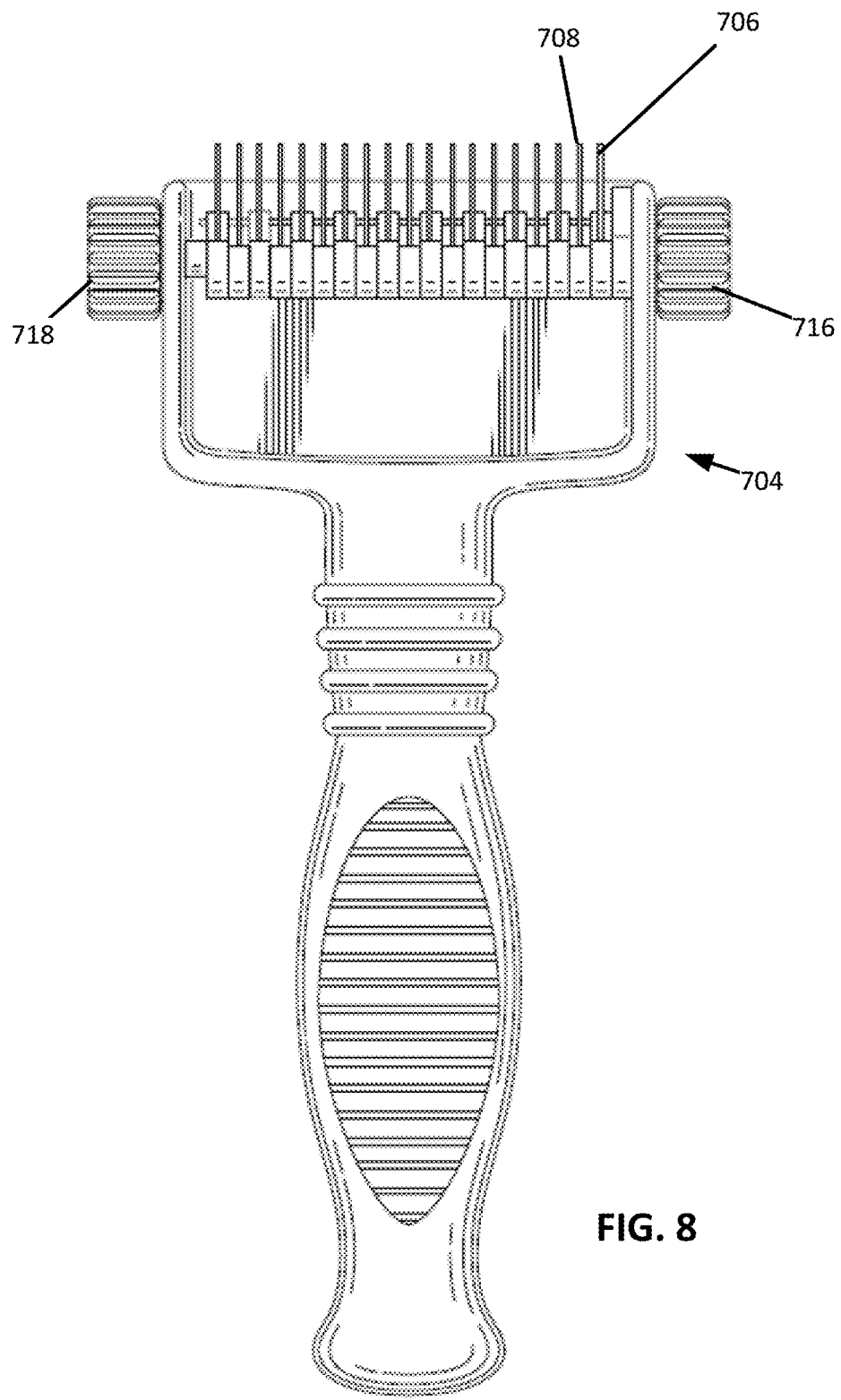
FIG. 8 shows a plan view of the brush of FIG. 7 having the teeth in an extended position, consistent with embodiments of the present disclosure.

For example, FIG. 8 shows the first and second plurality of teeth 706 and 708 in an extended position. When in the extended position, at least a portion of the first and second plurality of teeth 706 and 708 extend from the brush head 704 such that the first and second plurality of teeth 706 and 708 are capable of engaging, for example, the fur/hair of an animal. A rotation of the first and/or second knob 716 and 718 in a first rotation-direction (e.g., clockwise) may cause at least one of the first and/or second plurality of teeth 706 and 708 to transition into a retracted position.

Figure 9:
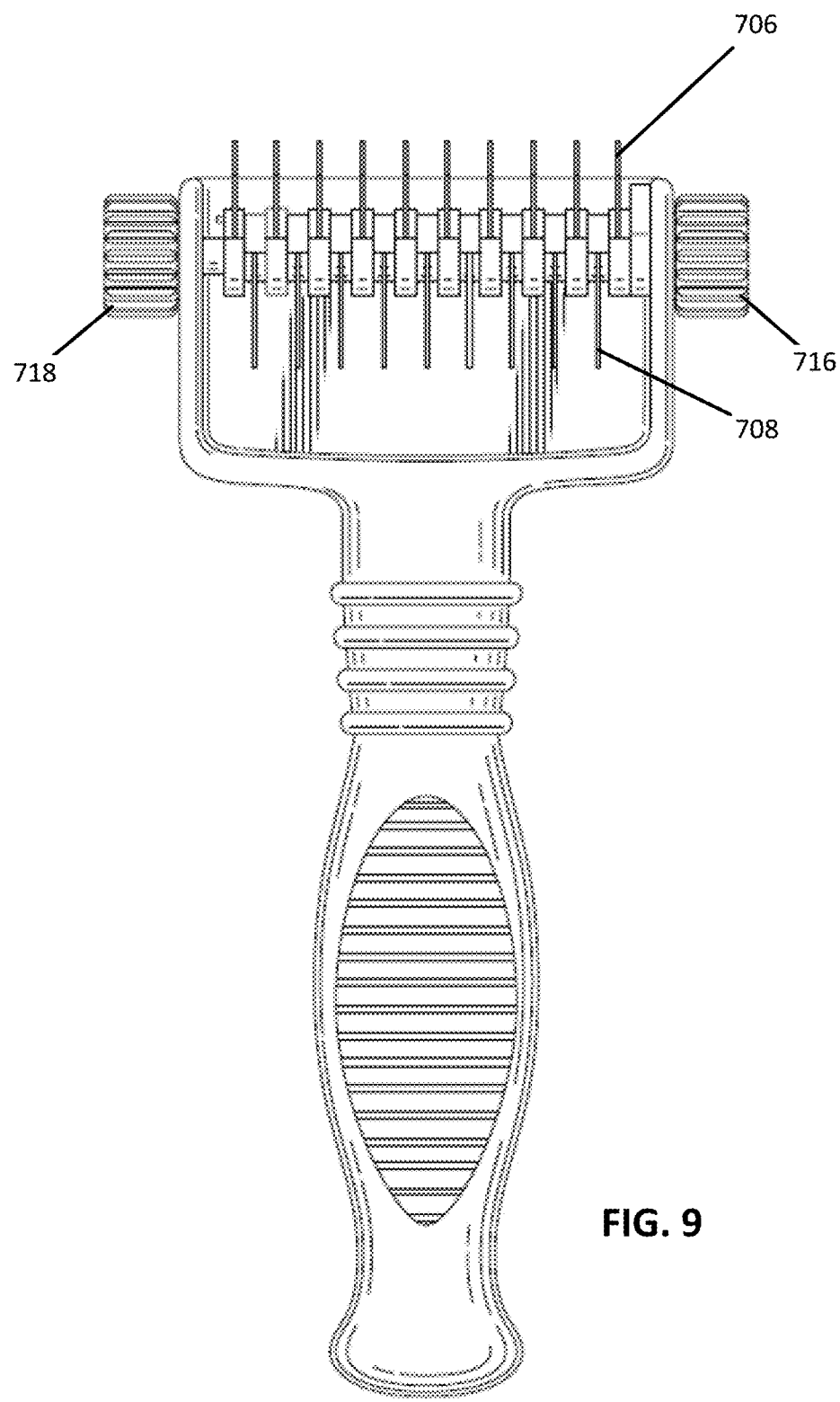
FIG. 9 shows a plan view of the brush of FIG. 7 having a first plurality of teeth in an extended position and a second plurality of teeth in a retracted position, consistent with embodiments of the present disclosure.

As shown, for example, in FIG. 9 a rotation of the second knob 718 in the first rotation-direction (e.g., clockwise) causes a corresponding rotation of the second plurality of teeth 708 such that the second plurality of teeth 708 transition from the extended position to the retracted position. As also shown, the first plurality of teeth 706 remain in the extended position when the second knob 718 is rotated in the first rotation-direction (e.g., clockwise). In other words, the second plurality of teeth 708 can rotate independently of the first plurality of teeth 706. A rotation of the first knob 716 in the first rotation-direction (e.g., clockwise) causes at least the first plurality of teeth 706 to transition into the retracted position.

Figure 10:
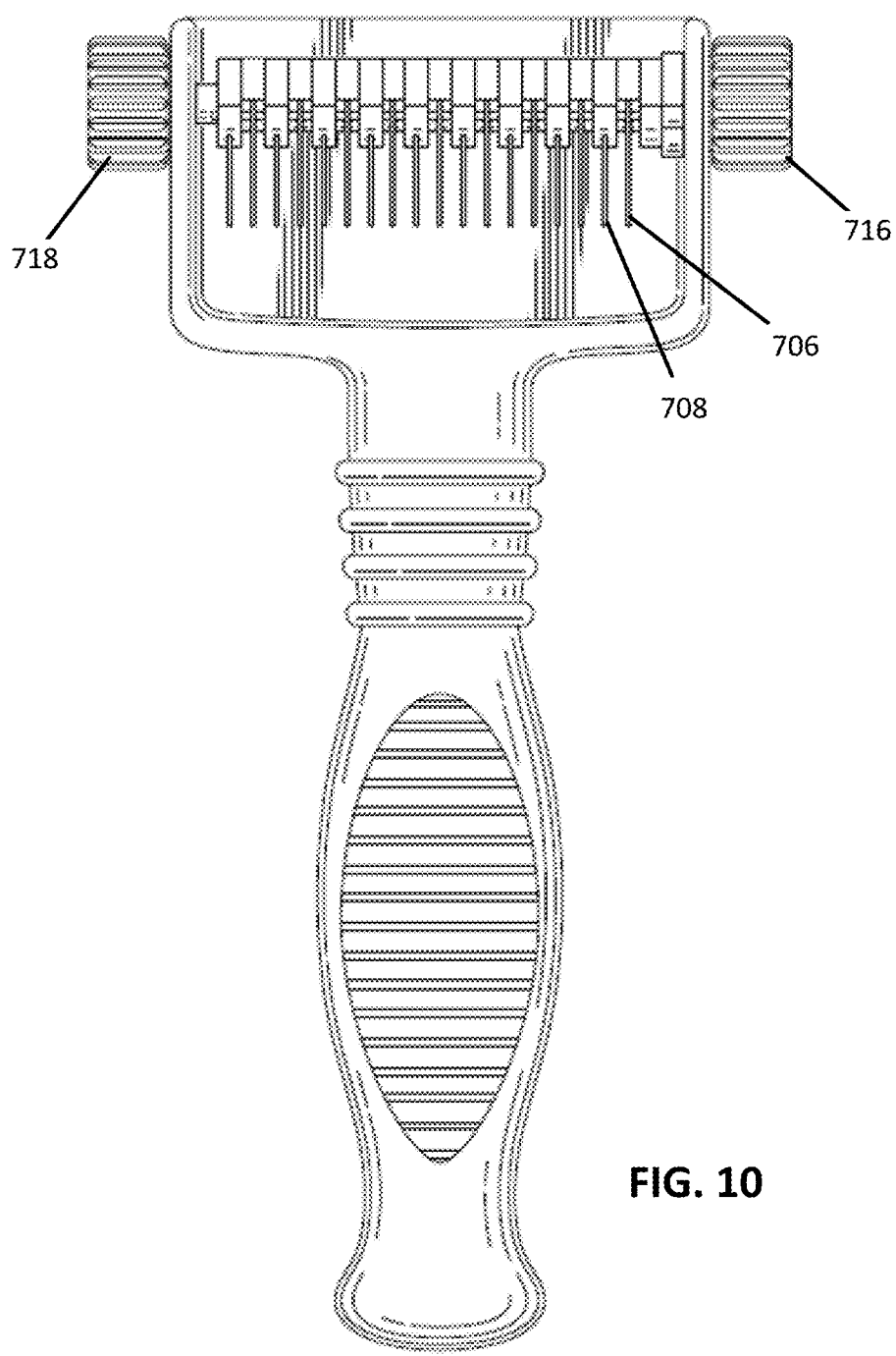
FIG. 10 shows a plan view of the brush of FIG. 7 having the teeth in a retracted position, consistent with embodiments of the present disclosure.

For example, as shown in FIG. 10, a rotation of the first knob 716 in the first rotation-direction (e.g., clockwise) causes a corresponding rotation of the first plurality of teeth 706 such that the first plurality of teeth 706 transition from the extended position to the retracted position. In some instances, when both the first and the second pluralities of teeth 706 and 708 are in the extended position, a rotation of the first knob 716 in the first rotation-direction (e.g., clockwise) causes both the first and second pluralities of teeth 706 and 708 to transition into the retracted position.

Similarly, a rotation of the second knob 718 in a second rotation-direction (e.g., counter clockwise), causes a corresponding rotation in both the first and second pluralities of teeth 706 and 708 such that both the first and second pluralities of teeth 706 and 708 are transitioned from the retracted position to the extended position. By way of further example, a rotation of the first knob 716 in the second rotation-direction (e.g., counter clockwise) may cause only the first plurality of teeth 706 to transition from the retracted position to the extended position. In other words, the first plurality of teeth 706 can rotate independently of the second plurality of teeth 708.

Figure 11:
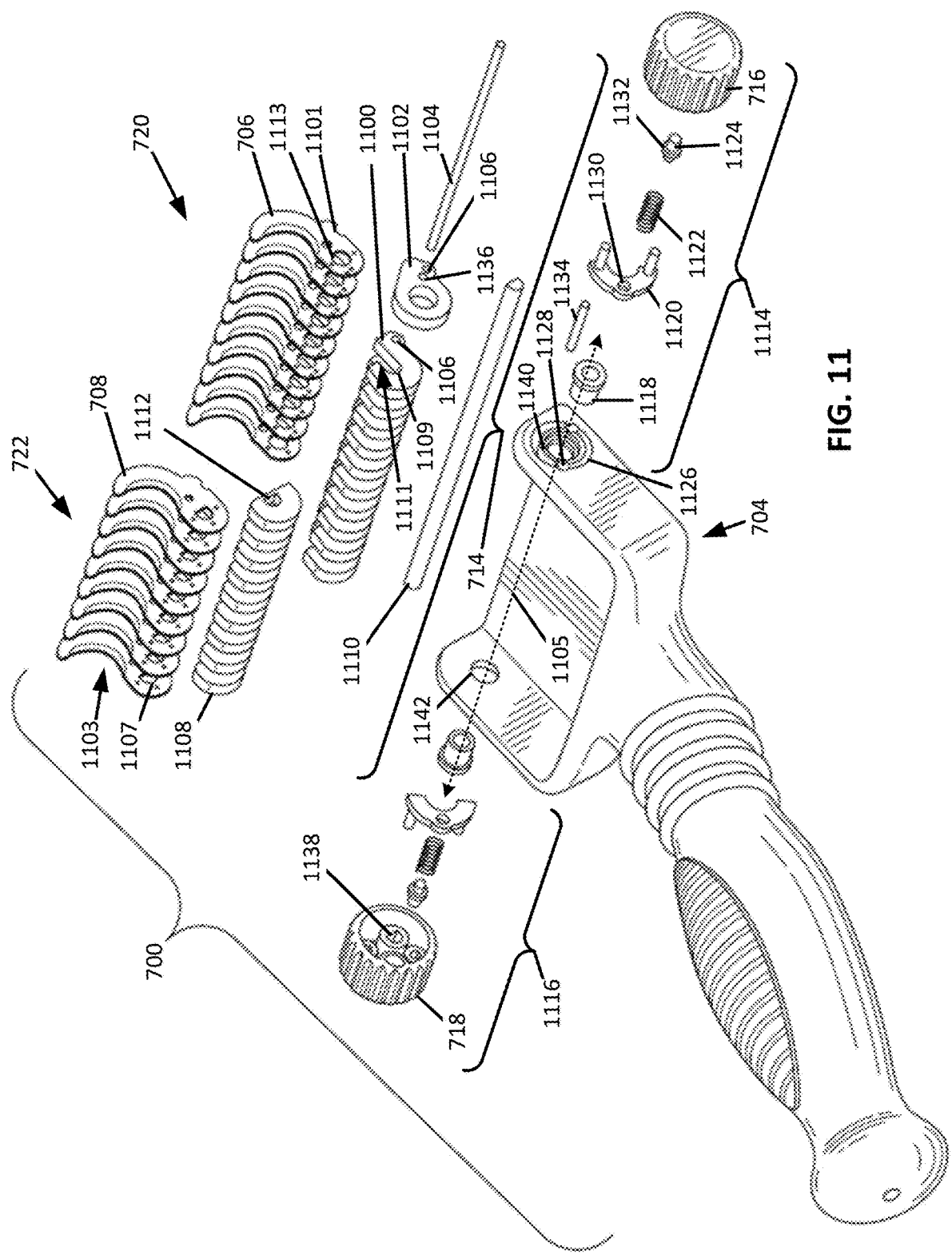
FIG. 11 shows an exploded view of the brush of FIG. 7, consistent with embodiments of the present disclosure.

FIG. 11 shows an exploded view of the brush 700. As shown, the first portion 720 of the carriage 714 includes a first plurality of teeth holders 1100 configured to couple to the first plurality of teeth 706, a spacer 1102, and a push shaft 1104. Each of the first plurality of teeth holders 1100 and the spacer 1102 include a push shaft opening 1106 for receiving at least a portion of the push shaft 1104. The push shaft 1104 may be coupled to at least one of the first plurality of teeth holders 1100 and/or the spacer 1102. For example, the push shaft 1104 may be coupled to at least one of the first plurality of teeth holders 1100 and/or the spacer 1102 using any one or more of an adhesive, a press-fit, a mechanical fastener (e.g., a screw or a bolt), and/or any other suitable form of coupling.

As shown, the push shaft 1104 is configured to extend through each of the push shaft openings 1106 and engage at least a portion of the first and/or second pluralities of teeth 706 and 708. In some instances, the first and second pluralities of teeth 706 and 708 include a push shaft recess 1101 that is configured to receive at least a portion of the push shaft 1104. The push shaft recesses 1101 are defined in the first and second pluralities of teeth 706 and 708 along a surface that is opposite an engagement surface 1103 of the first and second pluralities of teeth 706 and 708, wherein the engagement surface 1103 is configured to engage, for example, the fur/hair of an animal.

When the first and second pluralities of teeth 706 and 708 are in the extended position, a rotation of the first knob 716 causes the push shaft 1104 to rotate around a rotation axis 1105 of the first and second pluralities of teeth 706 and 708. In other words, the push shaft 1104 may generally be described as being spaced apart from the rotation axis 1105. The rotation of the push shaft 1104 around the rotation axis 1105 urges the first and second plurality of teeth 706 and 708 from the extended position and into the retracted position. As shown, the first plurality of teeth 706 are urged into the retracted position as a result of the push shaft 1104 extending through the push shaft openings in the first plurality of teeth holders. As also shown, the second plurality of teeth 708 are urged into the retracted position as a result of the engagement between the push shaft 1104 and the push shaft recesses 1101.

As shown, the second portion 722 of the carriage 714 includes a second plurality of teeth holders 1108 and a rotatable shaft 1110 that extends along the rotation axis 1105, wherein the second plurality of teeth holders 1108 are configured to couple to the second plurality of teeth 708. Each of the second plurality of teeth holders 1108 includes a rotatable shaft opening 1112 for receiving at least a portion of the rotatable shaft 1110. The second plurality of teeth holders 1108 are configured to rotate with the rotatable shaft 1110. As such, the rotatable shaft opening 1112 and the rotatable shaft 1110 may have corresponding non-circular cross-section shapes (e.g., as taken perpendicular to the rotation axis 1105) such that a rotation of the rotatable shaft 1110 results in a corresponding rotation of the second plurality of teeth holders 1108. For example, the rotatable shaft opening 1112 and the rotatable shaft 1110 may generally resemble a square, a triangle, a pentagon, a hexagon, an ellipse, a piriform, a half-circle, and/or any other suitable shape. Additionally, or alternatively, the rotatable shaft 1110 may be coupled to the second plurality of teeth holders 1108 using any one or more of an adhesive, a press-fit, a mechanical fastener (e.g., a screw or a bolt), and/or any other suitable form of coupling. In these instances, the rotatable shaft 1110 may not have a cross-sectional shape that corresponds to the rotatable shaft opening 1112.

In some instances, the second plurality of teeth 708 may each include a second tooth opening 1107 for receiving the rotatable shaft 1110. The second tooth opening 1107 may have a shape that generally corresponds to that of a cross-section of the rotatable shaft 1110 (e.g., as taken perpendicular to the rotation axis 1105). For example, the second tooth opening 1107 and the rotatable shaft 1110 may generally resemble a square, a triangle, a pentagon, a hexagon, an ellipse, a piriform, a half-circle, and/or any other suitable shape. Alternatively, the second tooth opening 1107 may have a shape that does not correspond to that of the rotatable shaft 1110. In these instances, the second tooth openings 1107 may be sized such that the rotatable shaft 1110 is capable of extending through each of second tooth openings 1107.

As shown, the rotatable shaft 1110 extends through the first plurality of teeth holders 1100 such that the rotatable shaft 1110 rotates relative to the first plurality of teeth holders 1100. For example, the first plurality of teeth holders 1100 may each include a rotatable shaft pass-through 1109 configured to receive the rotatable shaft 1110 and allow the rotatable shaft 1110 to rotate therein. As shown, the rotatable shaft pass-through 1109 may have at least one open end 1111. However, in some instances, the rotatable shaft pass-through 1109 may not include the open end 1111 (e.g., may be enclosed) but may be sized such that the rotatable shaft 1110 can rotate relative to the rotatable shaft pass-through 1109. Similarly, the first plurality of teeth 706 may each include a first tooth opening 1113 configured to receive the rotatable shaft 1110 such that the rotatable shaft 1110 can rotate relative to the first plurality of teeth 706. As such, a rotation of the rotatable shaft 1110 does not necessarily result in a corresponding rotation of the first plurality of teeth holders 1100 and the first plurality of teeth 706.

For example, when both the first and second plurality of teeth 706 and 708 are in the extended position, a rotation of the rotatable shaft 1110 in the first rotation-direction (e.g., clockwise) may cause only the second plurality of teeth 708 to transition into the retracted position. In other words, only the second plurality of teeth holders 1108 rotate in response to a rotation of the rotatable shaft 1110 in the first rotation-direction (e.g., clockwise). By way of further example, when both the first and second pluralities of teeth are in the retracted position, a rotation of the rotatable shaft 1110 in the second rotation-direction (e.g., counter clockwise) urges the second plurality of teeth 708 into engagement with the push shaft 1104 such that the push shaft 1104 rotates about the rotation axis 1105 and causes the first plurality of teeth 706 to transition into the extended position with the second plurality of teeth 708. In other words, both the first and second plurality of teeth holders 1100 and 1108 can rotate in response to the rotation of the rotatable shaft 1110 in the second rotation-direction (e.g., counter clockwise).

As shown, the first knob 716 is coupled to a first knob assembly 1114 and the second knob 718 is coupled to a second knob assembly 1116. As shown, both the first and second knob assemblies 1114 and 1116 include a bushing 1118, a carrier 1120, a biasing mechanism 1122, and a detent pin 1124.

The brush head 704 includes a first arm opening 1140 and a second arm opening 1142 for receiving a respective one of the bushings 1118 such that the rotatable shaft 1110 can extend through each bushing 1118. The brush head 704 also includes one or more tracks 1126 that are defined in respective ones of the plurality of arms 710. The track 1126 is configured to receive at least a portion of the detent pin 1124 such that the detent pin 1124 slides within the track 1126 in response to a rotation of the first and/or second knobs 716 and 718.

The track 1126 may include a plurality detent retaining recesses 1128 disposed on opposing ends of the track 1126. The plurality of detent retaining recesses 1128 are recessed relative to the track 1126 such that, when the detent pin 1124 is received within a respective detent retaining recess 1128, the first and/or second knobs 716 and 718 are substantially prevented from freely rotating. In other words, when the detent pin 1124 is received within a respective detent retaining recess 1128, the first and/or second knobs 716 and 718 are substantially prevented from rotation until an operator of the brush 700 turns one or more of the first and/or second knobs 716 and 718. As such, the first and/or second plurality of teeth 706 and 708 are held in the extended and/or retracted position until an operator of the brush 700 turns one or more of the first and/or second knobs 716 and 718.

The biasing mechanism 1122 urges the detent pin 1124 into the track 1126 such that the detent pin 1124 maintains engagement with the track 1126. The biasing mechanism 1122 may be, for example, a spring, a resiliently compressible member (e.g., a rubber), and/or any other suitable biasing mechanism for urging the detent pin 1124 into engagement with the track 1126.

The carrier 1120 couples the detent pin 1124 and the biasing mechanism to the first and/or second knobs 716 and 718. The carrier 1120 includes a detent pin opening 1130 configured to receive at least a portion of the detent pin 1124. As shown, at least a portion of the detent pin 1124 may have a dimension greater than that of the detent pin opening 1130 such that only a portion of the detent pin 1124 is capable of being received within the detent pin opening 1130. For example, the detent pin 1124 may include a flange 1132 having a diameter that is greater than that of the detent pin opening 1130.

As shown, the first knob assembly 1114 also includes a coupling shaft 1134 for coupling the first knob 716 to the spacer 1102. The spacer 1102 includes a coupling shaft opening 1136 configured to receive at least a portion of the coupling shaft 1134 such that a rotation of the first knob 716 causes a corresponding rotation of the spacer 1102. As previously discussed, a rotation of the spacer 1102 causes a corresponding rotation of the push shaft 1104 around the rotation axis 1105, which causes a corresponding rotation of at least the first plurality of teeth 706.

The coupling shaft opening 1136 is spaced apart from the push shaft opening 1106. For example, and as shown, the coupling shaft opening 1136 is closer to the rotation axis 1105 than the push shaft opening 1106. In other words, the coupling shaft opening 1136 may generally be described as being disposed between the rotation axis 1105 and the push shaft opening 1106. Such a configuration may increase the mechanical advantage (e.g., make rotation of the first knob 716 easier) without increasing the size of the brush head 704.

As shown, the second knob 718 is configured to be coupled to the rotatable shaft 1110 such that a rotation of the second knob 718 causes a corresponding rotation of the rotatable shaft 1110. As previously discussed, a rotation of the rotatable shaft 1110 causes a corresponding rotation of at least the second plurality of teeth 708. As shown, the second knob 718 includes a knob rotatable shaft opening 1138 for receiving at least a portion of the rotatable shaft 1110. The knob rotatable shaft opening 1138 may have a shape that generally corresponds to that of the rotatable shaft 1110. For example, the rotatable shaft 1110 and the knob rotatable shaft opening 1138 may be non-circular and/or semi-circular (e.g., a square, a triangle, a pentagon, a hexagon, an ellipse, a piriform, a half-circle, and/or any other suitable shape).

Additionally, or alternatively, the rotatable shaft 1110 may by coupled to knob rotatable shaft opening 1138 using for example any one or more of an adhesive, a press-fit, a mechanical fastener (e.g., a screw or a bolt), and/or any other suitable form of coupling.

As shown, the rotatable shaft 1110 extends from the second knob 718 through the second arm opening 1142 and into the first arm opening 1140. In some instances, the rotatable shaft 1110 extends into the first knob 716. In these instances, the rotatable shaft 1110 can rotate relative to the first knob 716 such that a rotation of the second knob 718 does not necessarily cause a corresponding rotation of the first knob 716. As such, the first and second pluralities of teeth 706 and 708 are capable of rotating independently of each other.

The brush 700 may be made of multiple materials. For example, the first plurality of teeth 706, the second plurality of teeth 708, the rotatable shaft 1110, the first plurality of teeth holders 1100, the second plurality teeth holders 1108, the push shaft 1104, the spacer 1102, the coupling shaft 1134, the detent pin 1124, the bushing 1118, the carrier 1120, the first knob 716, and/or the second knob 718 may be made of any one or more of a plastic (e.g., acrylonitrile butadiene styrene, polycarbonate/acrylonitrile butadiene styrene, low-density polyethylene, high-density polyethylene, or the like), a metal (e.g., a stainless steel alloy, an aluminum alloy, or the like), a wood (e.g., poplar, pine, oak, or the like), and/or any other suitable material.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An adjustable brush comprising:
    a brush head, the brush head including:
        a first plurality of teeth extending along a rotation axis; and
        a second plurality of teeth extending along the rotation axis, the second plurality of teeth being rotatable independently of the first plurality of teeth about the rotation axis;
    a handle extending from the brush head;
        wherein the brush head further comprises a carriage extending along the rotation axis, the first and second pluralities of teeth extending from the carriage; and
        wherein the carriage further comprises a rotatable shaft extending along the rotation axis.

2. The adjustable brush of claim 1, wherein the first plurality of teeth are rotatable about the rotation axis.

3. The adjustable brush of claim 1, wherein at least a portion of the carriage is rotatable about the rotation axis.

4. The adjustable brush of claim 1, wherein the rotatable shaft extends through the first plurality of teeth and the second plurality of teeth.

5. The adjustable brush of claim 4, wherein a rotation of the rotatable shaft in a first rotation-direction results in a corresponding rotation of the second plurality of teeth.

6. The adjustable brush of claim 5, wherein a rotation of the rotatable shaft in a second rotation-direction results in a corresponding rotation of the first plurality of teeth and the second plurality of teeth, the second rotation-direction being opposite the first rotation-direction.

7. The adjustable brush of claim 1, wherein the second plurality of teeth is evenly distributed between the first plurality of teeth.

8. The adjustable brush of claim 1, further comprising a knob, wherein a rotation of the knob causes a corresponding rotation of at least the second plurality of teeth about the rotation axis.

9. An adjustable brush comprising:
a brush head;
a handle extending from the brush head;
a first plurality of teeth and a second plurality of teeth, at least a portion of the first plurality and second plurality of teeth extending from the brush head;
a knob, a rotation of the knob causes a corresponding rotation of at least the second plurality of teeth about a rotation axis, the second plurality of teeth being rotatable independently of the first plurality of teeth;
wherein the brush head further comprises a carriage extending along the rotation axis, the first and second pluralities of teeth extending from the carriage; and
wherein the carriage further comprises a rotatable shaft coupled to the knob and extending along the rotation axis.

10. The adjustable brush of claim 9, wherein the first plurality of teeth are rotatable about the rotation axis.

11. The adjustable brush of claim 9, wherein at least a portion of the carriage is rotatable about the rotation axis.

12. The adjustable brush of claim 9, wherein the rotatable shaft extends through the first plurality of teeth and the second plurality of teeth.

13. The adjustable brush of claim 12, wherein a rotation of the rotatable shaft in a first rotation-direction results in a corresponding rotation of the second plurality of teeth.

14. The adjustable brush of claim 13, wherein a rotation of the rotatable shaft in a second rotation-direction results in a corresponding rotation of the first plurality of teeth and the second plurality of teeth, the second rotation-direction being opposite the first rotation-direction.

15. The adjustable brush of claim 9, wherein the second plurality of teeth is evenly distributed between the first plurality of teeth.

16. An adjustable brush comprising:
a brush head, the brush head including:
a first plurality of teeth extending along a rotation axis; and
a second plurality of teeth extending along the rotation axis, the second plurality of teeth being rotatable independently of the first plurality of teeth about the rotation axis;
a handle extending from the brush head;
wherein the handle has an elongated length which extends transverse to the rotation axis.

17. The adjustable brush of claim 16, wherein the first plurality of teeth are rotatable about the rotation axis.

18. The adjustable brush of claim 16, wherein the brush head further comprises a carriage extending along the rotation axis, the first and second pluralities of teeth extending from the carriage.

19. The adjustable brush of claim 18, wherein at least a portion of the carriage is rotatable about the rotation axis.

20. The adjustable brush of claim 18, wherein the carriage further comprises a rotatable shaft extending along the rotation axis.

* * * * *